(12) United States Patent
Pope et al.

(10) Patent No.: US 8,423,639 B2
(45) Date of Patent: Apr. 16, 2013

(54) SWITCHING API

(75) Inventors: Steven L. Pope, Costa Mesa, CA (US); David Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 225 days.

(21) Appl. No.: 12/900,217

(22) Filed: Oct. 7, 2010

(65) Prior Publication Data
US 2011/0087774 A1    Apr. 14, 2011

Related U.S. Application Data

(60) Provisional application No. 61/249,881, filed on Oct. 8, 2009.

(51) Int. Cl.
*G06F 15/16*    (2006.01)

(52) U.S. Cl.
USPC ............. 709/224; 709/242; 709/232; 726/13; 726/24; 726/26; 710/19; 710/15; 710/62; 710/67; 370/235; 370/232; 370/241; 370/244; 370/236

(58) Field of Classification Search .................. 709/224, 709/242, 238, 232
See application file for complete search history.

(56) References Cited

U.S. PATENT DOCUMENTS

| | | |
|---|---|---|
| 5,272,599 A | 12/1993 | Koenen |
| 5,325,532 A | 6/1994 | Crosswy et al. |
| 5,946,189 A | 8/1999 | Koenen et al. |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |

(Continued)

FOREIGN PATENT DOCUMENTS

| | | |
|---|---|---|
| EP | 620521 A2 | 10/1994 |
| WO | 0148972 A1 | 7/2001 |

(Continued)

OTHER PUBLICATIONS

Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

(Continued)

*Primary Examiner* — Jude Jean Gilles
(74) *Attorney, Agent, or Firm* — Haynes Beffel & Wolfeld LLP; Warren S. Wolfeld (57) ABSTRACT

A network interface device for a data processing system comprising: one or more network connection ports for connection to a network; a routing table supported at a memory of the network interface device; a controller operable to modify the routing table; and a control plane interface of the controller arranged to receive routing table update instructions carried in one or more control packets received at the said ports; wherein the control plane interface is configured to, on receiving a routing table update instruction, cause the controller to update the routing table in accordance with the routing table update instruction.

20 Claims, 2 Drawing Sheets

U.S. PATENT DOCUMENTS

| | | |
|---|---|---|
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0037167 A1 | 2/2003 | Garcia-Luna-Aceves et al. |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0049621 A1* | 2/2008 | McGuire et al. ............ 370/236.2 |
| 2008/0072236 A1 | 3/2008 | Pope et al. |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0245099 A1 | 10/2009 | Tsuchiya |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0118868 A1* | 5/2010 | Dabagh et al. ................. 370/389 |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | |
|---|---|---|
| WO | 0235838 A1 | 5/2002 |
| WO | 2008127672 A2 | 10/2008 |
| WO | 2009/134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.

Bruce Lowekamp, et al.; ACM Computer Communication Review, vol. 31, No. 4, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: the 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference, Jan. 1996.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, Apr. 22, 2001.
M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Cisco/VMware brochure Version: 1 Date: Jun. 17, 2009, "DMZ Virtualization Using VMware vSphere 4 and the Cisco Nexus 1000V Virtual Switch," 20 pp.
Cisco white paper, "Cisco VN-Link: Virtualization-Aware Networking," C11-525307-00, 2009 9 pp.
Cisco brochure, "VMware and Cisco Virtualization Solution: Accelerate Your Server Consolidation Strategy," C02-552519-00, 2009, 3 pp.
Cisco/VMware brochure, "VMware vSphere 4 and Cisco Nexus 1000V series: Accelerate Data Center Virtualization," 2008, 5 pp.
Cisco brochure, "VMware and Cisco Virtualization Solution: Scale Virtual Machine Networking," C02-552517-00, 2009, 4 pp.
Cisco brochure, "Cisco Data Center 3.0 Roadmap for Data Center Infrastructure Transformation," C22-516393-01, 2009, 6 pp.
Cisco brochure, "Cisco VN-Link Virtual Machine-Aware Networking," C45-532467-00, 2009, 2 pp.
C. A. Thekkath, et al.; ACM Computer Communication Review, vol. 23, No. 4, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May. 1994.
Stuart Wray, et al.; Proceedings of the International Conference on Multimedia Computing and Systems, p. 265-273, Boston, May. 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.

P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo; ACM Computer Communication Review, vol. 4 No. 1, Jan. 1974.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Derek Robert McAuley; PhD Thesis, University of Cambridge, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
Bruce S. Davie; ACM Computer Communication Review, vol. 21, No. 4, Sep. 1991.
C. Brendan S. Traw, et al.; ACM Computer Communication Review, vol. 21, No. 4, p. 317-325, Sep. 1991.

Ian Leslie and Derek R. McAuley; ACM Computer Communication Review, vol. 21, No. 4, p. 327, Sep. 1991.

Mark Hayter, Derek McAuley; ACM Operating Systems Review, vol. 25, Issue 4, p. 14-21, Oct. 1991.

Gregory G. Finn; ACM Computer Communication Review, vol. 21, No. 5, p. 18-29, Oct. 1991.

Greg Chesson; Proceedings of the Third International Conference on High Speed Networking, Nov. 1991.

Michael J. Dixon; University of Cambridge Computer Laboratory Technical Report No. 245, Jan. 1992.

Danny Cohen, Gregory Finn, Robert Felderman, Annette DeSchon; Made available by authors, Jan. 10, 1992.

Gene Tsudik; ACM Computer Communication Review, vol. 22, No. 5, pp. 29-38, Oct. 1992.

Peter Steenkiste; ACM Computer Communication Review, vol. 22, No. 4, Oct. 1992.

Paul E. McKenney and Ken F. Dove; ACM Computer Communication Review, vol. 22, No. 4, Oct. 1992.

Erich Ruetsche and Matthias Kaiserswerth; Proceedings of the IFIP TC6/WG6.4 Fourth International Conference on High Performance Networking IV, Dec. 14, 1992.

C. Traw and J. Smith; IEEE Journal on Selected Areas in Communications, pp. 240-253, Feb. 1993.

E. Ruetsche; ACM Computer Communication Review, vol. 23, No. 3, Jul. 1993.

Jonathan M. Smith and C. Brendan S. Traw; IEEE Network, vol. 7, Issue 4, pp. 44-52, Jul. 1993.

Jeffrey R. Michel; MSci Thesis, University of Virginia, Aug. 1993.

Mark David Hayter; PhD Thesis, University of Cambridge, Sep. 1993.

Jonathan Kay and Joseph Pasquale; ACM Computer Communication Review, vol. 23, No. 4, pp. 259-268, Oct. 1993.

W. E. Leland, et al.; ACM Computer Communication Review, vol. 23, No. 4, p. 85-95, Oct. 1993.

Extended EP search report mailed Nov. 11, 2010 in related application EP 10 18 3452.

* cited by examiner

SWITCHING API

BACKGROUND OF THE INVENTION

This invention relates to the control of routing tables at switching nodes in a network. In particular, the invention relates to control plane interfaces for a device driver and a network interface device by means of which routing tables can be updated.

Various protocols are known in the art that allow the routing tables of network entities to be remotely accessed. For example, the Simple Network Management Protocol (SNMP) can be used to manage objects on a network and to query the routing tables of objects such as switches and routers. SNMP is an application layer protocol and requires a software agent (typically of the operating system) to provide routing information in response to queries from managing entities on the network. There are also many proprietary protocols which allow network administrators to manage the routing tables of suitable switches, such as HP Virtual Connect.

Other protocols, such as Multiple VLAN Registration Protocol (MVRP), have been developed to allow routing tables to be updated so as to define new VLANs and configure existing ones. MVRP is a data link layer protocol (layer 2 of the OSI model) which provides an interface for managing one or more virtual networks over a physical network infrastructure.

Figure 1:
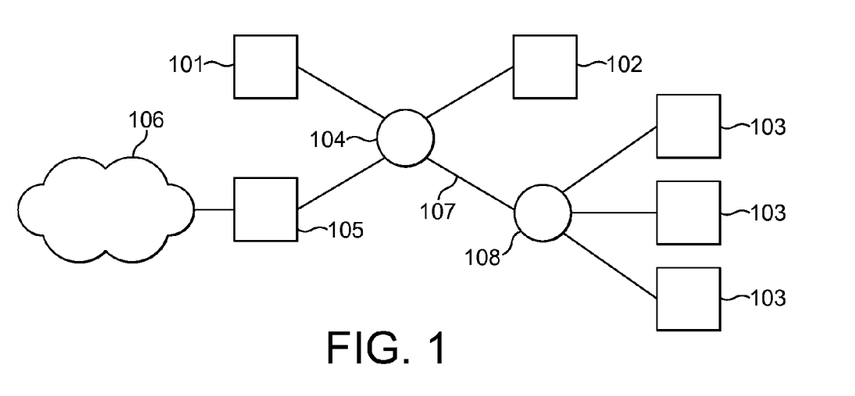
FIG. 1 is a illustrates a typical network configuration.

FIG. 1 illustrates a typical network configuration. A number of network entities (such as servers 103, desktop computer 101, network printer 102 etc.) are connected to one another by means of a network which comprises interconnects 107 and switches 104, 108. Data packets are routed over the network from one entity to another by the switches. For example, if desktop computer 101 wishes to send data to printer 102 it will transmit data over the interconnect to switch 104 which will direct the packets to printer 102. Similarly, if data packets arrive at gateway 105 from the internet 106 for one of the servers 103, switches 104 and 108 will act so as to direct the incoming packets to the appropriate server.

A network switch maintains a routing table relating the network address of each entity to the physical port supporting an interconnect over which data packets should be directed so as to reach that entity. Thus, each switch knows how to route each packet from the entries in its routing table. Generally, network protocols define mechanisms by which a switch can learn new routes and make new entries in its routing table—often using Address Resolution Protocol (ARP), which allows a switch to look up the hardware address of a host when only the network address of the host is known. This allows a switch to, inter alia: handle packets for new entities on the network; modify the routing of packets for a particular entity where there is more than one possible route between the switch and entity so as to optimise network traffic; modify the routing of packets in accordance with a quality of service (QoS) protocol.

Figure 2:
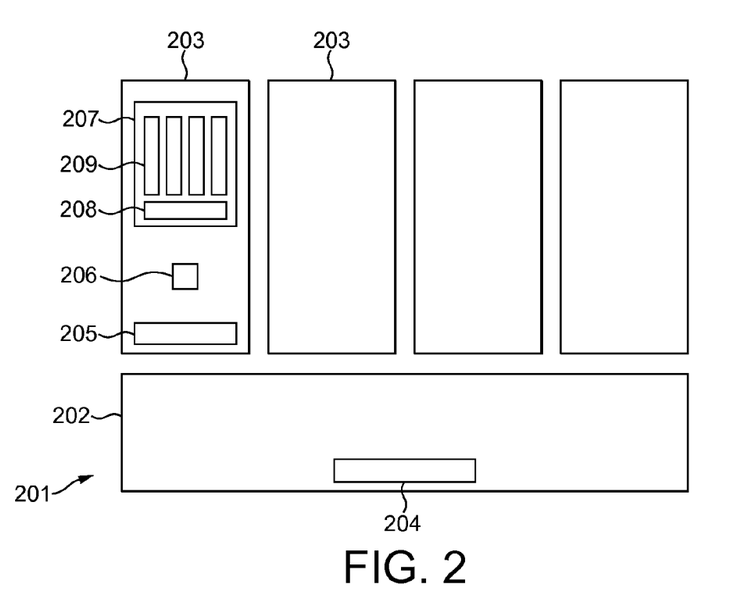
FIG. 2 is a schematic drawing of a typical blade server.

However, it is now commonplace for each physical network entity to support multiple virtualised systems. For example, a server can support multiple guest operating systems managed by a hypervisor, with each guest operating system supporting multiple application endpoints having their own network addresses. A blade server (shown in FIG. 2) is more complex still, with a single server chassis 201 comprising multiple "blades" 203, each having one or more processors 206 and a network interface device 205. Server chassis 201 includes one or more network interface devices 204 by means of which the server can communicate with a network. Each blade is a self-contained server module typically supporting a hypervisor 208 within software domain 207 and one or more guest operating systems 209 managed by the hypervisor. Thus, a single blade server can support many guest operating systems. This additional complexity within a network entity requires it to support additional routing tables so as to allow packets received over the network to be routed to the correct endpoint of the correct guest operating system (and in the case of a blade server) of the correct blade.

A blade server therefore generally has a routing table at the one or more network interface devices of the server chassis, a routing table at the network interface devices of each of the blades, and a routing table at the hypervisor of each of the blades. Each of these must be maintained in a similar manner to those of a hardware switch situated between the interconnects of a network.

A particular difficulty is presented when a live guest operating system migrates from one blade to another, or from one server to another. In order to maintain the integrity of the connections of that guest, all the affected routing tables (of the hardware switches, network interface devices and hypervisor) must be updated as quickly as possible so that network traffic to and from the guest is appropriately redirected. However, most conventional mechanisms for modifying routing tables are proprietary protocols restricted to managing the routing tables of hardware switches supporting the proprietary protocols. The network interface devices and hypervisors of servers and other computer systems do not provide an efficient mechanism by which their routing tables can be updated.

In conventional systems, on migrating a guest operating system from one system (blade or server) to another it might be possible in some networks to update the routing tables of certain switches using management protocols provided by the switch vendor, but it is not possible to update all the affected routing tables—including those supported at the network interface devices of servers and in software—by means of a single mechanism. Thus, any changes to the routing tables due to the migration (say) of a guest operating system slowly filter through the network by means of outdated mechanisms such as ARP. In a typical network, ARP can take 30 seconds to update the affected routing tables, even when the fabric speed is 1 Gbps or more. This can prevent guests being seamlessly migrated between hosts, which is a particular problem in server farms that are becoming increasingly virtualised and strive to minimise the downtime of their servers.

It would be therefore be useful if there were a mechanism by which all the affected routing tables in a network—in particular those of virtualised servers—can be updated in response to server configuration changes or other network changes which have an impact on packet routing.

SUMMARY OF THE INVENTION

According to a first aspect of the present invention there is provided a network interface device for a data processing system comprising: one or more network connection ports for connection to a network; a routing table supported at a memory of the network interface device; a controller operable to modify the routing table; and a control plane interface of the controller arranged to receive routing table update instructions carried in one or more control packets received at the said ports; wherein the control plane interface is configured to, on receiving a routing table update instruction, cause the controller to update the routing table in accordance with the routing table update instruction.

The network interface device can further comprise a filter configured to monitor data received at the one or more ports and, on identifying the one or more control packets, trap said control packets and pass the control packets or data contained therein to the control plane interface. Preferably the filter is configured to identify the one or more control packets using one or more of the following identifiers: the protocol to which control packets belong; the destination address of control packets; the source address of control packets; the presence of a flag or other identifier in the header of control packets. Suitably the filter is configured to write control packets into a receive queue associated with the control plane interface.

The routing table update instruction can identify a plurality of entries in the routing table for updating. Preferably the receive queue has a unique network address and the control packets are directed to that network address.

The control plane interface is preferably responsive to routing table instructions that include one or more of: a command to make or update an entry in the routing table; a command to delete an entry in the routing table; a command to read one or more entries in the routing table and cause data representing said entries to be returned to a network address specified in the control packets.

Suitably, the control plane interface is operable to cause the network interface device to transmit onto the network a control packet comprising a request for one or more routing table update instructions.

Preferably the control plane interface is configured to cause the network interface device to transmit the control packet onto the network when the network interface device receives one or more data packets which cannot be correctly routed using the routing table.

The network interface device can be one of a switch, a router, and a switching network interface device supported at the chassis of a blade server.

According to a second aspect of the present invention there is provided a data processing system comprising: a network interface device comprising a routing table; a device driver for the network interface device supported at a privileged software domain of the data processing system and comprising a control plane interface arranged to receive routing table instructions; and a filter configured to trap control packets carrying one or more routing table instructions received at the network interface device and pass those control packets or data contained therein to the control plane interface; wherein the control plane interface is configured to, on receiving a routing table update instruction, cause the device driver to update the routing table at the network interface device in accordance with the routing table update instruction.

Suitably the network interface device is configured to route data packets to and from a plurality of virtual network interfaces presented to a plurality of unprivileged software domains supported at the data processing system. The privileged software domain can be a hypervisor and the unprivileged software domains can be virtual machines. The privileged software domain can be the kernel of an operating system and the unprivileged software domains can be applications executing at the user level of the operating system.

The data processing system may further comprise a soft switching entity supported at the privileged software domain, the soft switching entity having a routing table and being coupled to a second control plane interface arranged to receive routing table instructions, wherein, on receiving a routing table update instruction at the second control plane interface, the second control plane interface is configured to cause the soft routing table to be updated in accordance with the routing table update instruction.

Preferably the second control plane interface is supported at the device driver. Alternatively, the second control plane interface is supported at the soft switching entity.

Suitably the soft switching entity is configured to route data packets to and from a plurality of unprivileged software domains supported at the data processing system.

Suitably the data processing system is a blade of a blade server.

According to a third aspect of the present invention there is provided a blade server comprising: at the chassis of the blade server, one or more network interface devices as described above in relation to the first aspect of the present invention; and a plurality of blades, each blade of the blade server being a data processing system as described above in relation to the second aspect of the present invention.

According to a fourth aspect of the present invention there is provided a network interface device and device driver, the device driver being operable to modify a routing table at the network interface device when the device driver is installed into a data processing system supporting the network interface device, and the device driver, when installed, presenting a control plane interface arranged to receive routing table instructions carried in one or more control packets received at the network interface device, wherein, on receiving a routing table update instruction, the control plane interface is configured to cause the device driver to update the routing table at the network interface device in accordance with the routing table update instruction.

According to a fifth aspect of the present invention there is provided a network interface device and device driver configured such that when the device driver is installed into a data processing system supporting the network interface device the device driver is operable to modify a routing table stored at the network interface device, the network interface device being operable to receive one or more control packets comprising routing table instructions; and the device driver being configured to, when installed, present a control plane interface arranged to receive routing table instructions carried in one or more control packets received at the network interface device; wherein, on receiving a routing table update instruction, the control plane interface is configured to cause the device driver to update the routing table at the network interface device in accordance with each routing table update instruction.

According to a sixth aspect of the present invention there is provided a method for managing a switching entity accessible to a management unit over a network, the switching entity supporting a routing table and being operable to present a control plane interface to the management unit, the method comprising: the management unit transmitting to the switching entity one or more control packets that include one or more routing table update instructions; and the switching entity: receiving the one or more control packets at the control plane interface; and the control plane interface causing the switching device to update its routing table in accordance with the routing table update instructions; wherein the switching entity is any one of a hardware switch, a privileged mode soft switch supported at a data processing system, and a switching network interface device supported at a data processing system.

According to a seventh aspect of the present invention there is provided a system comprising: a blade server as described above in relation to the third aspect of the present invention, the plurality of blades being configured as described above in relation to the second aspect of the present invention; a network interface device as described above in relation to the first aspect of the present invention, the network interface device being a network switch external to the blade server; a network management entity accessible to the blade server and network switch over a network; wherein the network management entity is configured to, on initiating the migration of a guest operating system supported at a first blade of the blade server from that blade sever to another entity on the network, to transmit one or more routing table update instructions to the blade server and network switch so as to cause the network switch, the network interface device at the chassis of the blade server, the network interface device at the first blade of the blade server, and the soft switching entity at the first blade to have each of their respective routing tables updated in accordance with the routing table update instruction

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention is directed to providing a standard control plane interface for a switching entity at all levels of a network fabric. In a first embodiment, the present invention is directed to providing a device driver for a network interface device, the device driver providing a control plane interface by means of which a routing table supported at the network interface device can be updated. The device driver can additionally provide a second control plane interface for updating a software routing table supported at a hypervisor of the data processing system at which the network interface device is supported. In a second embodiment, the present invention is directed to providing a network interface device (NIC) having a control plane interface by means of which a routing table supported at the network interface device can be updated. The control plane interface can be provided by a management controller of the NIC.

The present invention relates to routing tables for switching network entities such as switches, routers, and the network interface devices of servers and other data processing systems. A switching network entity is a network entity comprising a routing table. The switching network entity can operate at any layer of the Open System Interconnection (OSI) Reference Model and could be, by way of example, any of the following: a layer 2 switch, a layer 3 switch or router, a multi-layer switch, and a layer 4 load-balancer. The switching network entity could be operable to perform layer 2 forwarding on the basis of, for example, Ethernet headers, or any arbitrary tag bits.

The term "routing table" as used herein refers to the entire routing or forwarding information subsystem of a network entity and encompasses forwarding tables compiled from a list of preferred routes as well as those constructs that are widely referred to as "routing tables", which contain a more exhaustive list of associations between network addresses and hardware addresses or port numbers. A routing table may, for example, comprise routing information for a physical network fabric and one or more virtual networks (VLANs), as well as the parameters of network protocols (such as IP packet flow parameters or those of any other link or internet layer protocol) and the maximum transmit unit (MTU) size of connections. The routing table includes the routing information relevant to the one of more layers of the OSI model at which the associated switching network entity operates. The logic (defined in hardware or software) of a switching network entity that is configured to manage its routing table is referred to as the control plane of the switching network entity.

Figure 3:
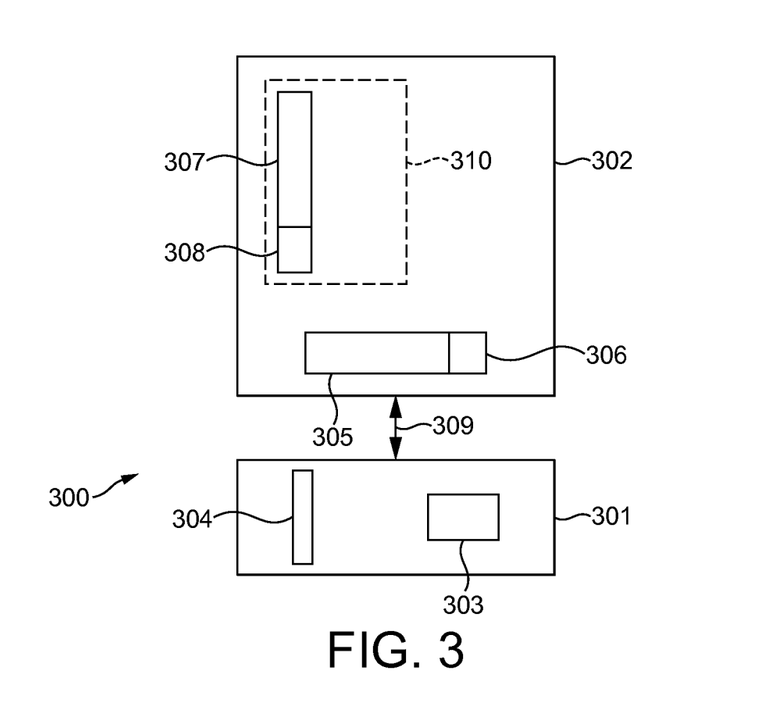
FIG. 3 is a schematic drawing of a data processing system and network interface device configured in accordance with the present invention.

A data processing system 300 including a network interface device 301 configured in accordance with a first embodiment of the present invention is shown in FIG. 3. Data processing system 300 may be a blade of a blade server, in which case network interface device 301 is the network interface device of the blade, or a computing device having a non-modular hardware arrangement—such as a more regular desktop or server—in which case network interface device 301 is one of the one or more network interface devices supported at the computing device. The network interface device is a switching entity that supports a routing table 304. Amongst other reasons, a NIC can support a routing table if it has multiple ports (and can therefore act as a switch, routing data between its ports in accordance with the entries in its routing table) or if the NIC presents one or more virtualised network interface devices (VNICs) to a virtualised operating system.

Data processing system 300 supports a software domain 302, which could be the privileged domain of a virtualised system (e.g. a hypervisor) or of a monolithic system (e.g. an operating system kernel) supporting one or more unprivileged domains (e.g. applications or guest operating systems). The software domain supports a device driver 305 for network interface device 301, as is well known in the art. However, in accordance with the first embodiment of the present invention, the device driver provides a control plane interface 306 configured to receive routing table update instructions over the network and cause the device driver to update the routing table 304 of the NIC in accordance with those instructions. The device driver therefore requires read/write access (as appropriate) to the routing table of its NIC, or the device driver and NIC must be configured such that the device driver can control the NIC to update its routing table.

The network interface device and software domain 302 are configured such that all data packets belonging to a predetermined protocol are directed to the control plane interface. This can be achieved through the use of a filter at the NIC or software domain that is configured to trap and direct all packets of the predetermined protocol (or at least data carried in those packets) to the interface of the device driver. For example, on the NIC trapping a data packet of the predetermined protocol the NIC could write an event to an event queue monitored by the device driver, or write at least some of the data carried in the data packets to a predetermined area of memory of the data processing system for retrieval by the device driver, or any one of a number of other techniques known in the art.

The network interface device could be set up with a default internal control plane. For example, a NIC could be configured to by default forward all packets to a default virtual interface. The control plane operations of interface 306 would therefore modify the default behaviour only for particular flows. This could be used for example to enable a hardware accelerated route for the flows belonging to a high priority application. The data packets relating to such accelerated data flows would be diverted (in a modification of the default behaviour) to the high priority application prior to the point at which the control plane operations of interface 306 are applied.

Control plane interface 306 is configured to parse the data it receives and cause the device driver to update routing table 304 in accordance with the instructions contained therein. For example, the instructions could comprise one or more commands such as SET( ) or DELETE( ) where the parameters of those commands indicate the entries to be written or deleted from the routing table. The instructions could identify multiple entries in a routing table—for example, an instruction could include a command to update all of the entries for a particular hardware address, or all those for a range of network addresses.

It is advantageous if interface 306 can verify the origin of the instructions it receives. This can be achieved through the use of a secure connection between the originating network entity and the network interface device, through the use of an identifier included with the instructions (for example, an authentication certificate or key), or one of a number of other authentication means known in the art. This ensures that the instructions are received from a trusted network entity.

On receiving instructions indicating that routing table 304 is to be updated, interface 306 causes the device driver to update the routing table. This can be achieved through the use of low-level commands over bus 309 from the device driver to controller 303 of the network interface device. Bus 309 could be, for example, a PCIe or PCI-X bus. Controller 303 has read/write access to the routing table and, on receiving appropriate commands from the device driver, updates the routing table in accordance with the instructions received at the control plane interface. These can include writing new entries to the routing table, updating existing entries in the routing table, or deleting entries from the routing table.

The instructions received at the interface could also include a query instruction requesting that the interface causes one or more entries from the routing table to be returned to the network entity from which the query originated. This mechanism allows other network entities to learn the routing tables of the data processing system. In particular, the provision of a query instruction in a network that includes entities configured in accordance with the present invention allows a central management unit on a network to fully map the topology of the network, from the physical interconnect fabric up to the endpoints of each virtual machine or guest domain.

In certain data processing systems, such as in virtualised systems, a further software routing table is provided to route data between the various endpoints of the software domain (e.g. between virtual machines supported at the data processing system). In other words, the software domain comprises a soft switching entity 310. In accordance with the first embodiment of the present invention, it is preferred if software routing table 307 within software domain 302 is provided with a control plane interface 308. Interface 308 operates in an analogous manner to interface 306 and similarly receives data of the predetermined protocol which is trapped by a packet filter at either NIC 301 or software domain 302. Thus, interface 308 is configured to update routing table 307 in accordance with routing table instructions received over the network.

As described, interface 308 can be provided as a distinct entity in the software domain—for example, as a component of the kernel or hypervisor. Alternatively, interface 308 may be provided at device driver 305 such that the device driver presents two control plane interfaces: one to receive routing table updates for the routing table at the NIC, and one to receive routing table updates for the software routing table. It can be advantageous if interface 308 is accessible to a network management application running on a node in the data processing system and having the necessary privilege level to access the device driver. This provides an alternative or additional path by which soft interfaces 308 at a data processing system (there may be more than one soft interface) can be managed, since the network management application could be configured to be controlled by managing entities on the network.

Figure 4:
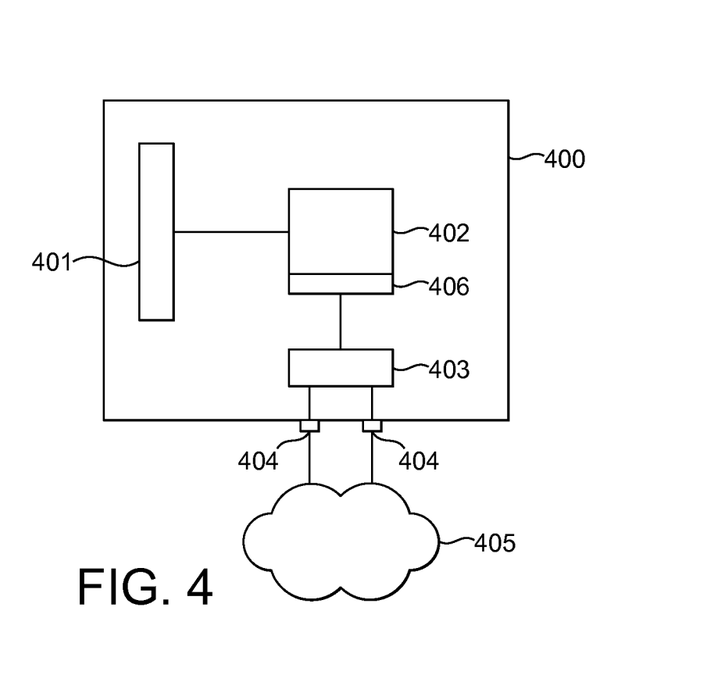
FIG. 4 is a schematic drawing of a network switching entity configured in accordance with the present invention.

A second embodiment of the present invention is shown in FIG. 4. Switching entity 400 (which can be a switch, router, or any other hardware configured to switch data packets in a network) comprises a routing table 401, controller 402 and filter 403. The controller includes control plane logic configured to manage the routing table by reading and writing entries to the table. In practice, one or both of filter 403 and routing table 401 could be considered to be part of controller 402. Switching entity 400 further comprises a plurality of ports 404 by means of which data can be received from and transmitted onto a network 405.

In one example, the switching device is a switch having one or more upstream ports and a plurality of downstream ports, the switch acting to route data between the upstream and downstream portions of the network. Such a switch could be used to route data between a server (connected to an upstream port of the switch) and a plurality of computers served by that server (each computer being connected to downstream ports of the switch). In another example, the switching device 400 is a network interface device supported at a data processing system, such as a server, the chassis of a blade server, or a blade of a blade server.

Controller 402 presents an interface 406 to the control plane of the network interface device in the same way that interfaces 306 and 308 discussed above provide interfaces to the control planes of a network interface device supported by a software device driver and a soft switching entity, respectively. Control plane interface 406 is configured to parse the data it receives and cause routing table 401 to be updated in accordance with the instructions contained therein. For example, the instructions could comprise one or more commands such as SET( ) or DELETE( ) where the parameters of those commands indicate the entries to be written or deleted (respectively) from the routing table. The instructions could identify multiple entries in a routing table—for example, an instruction could include a command to update all of the entries for a particular hardware address, or all those for a range of network addresses.

Filter 403 is configured to trap data packets of a predetermined protocol and pass those packets or data carried within those packets to interface 406. This can be achieved by writing the data packets or data contained therein to a buffer memory and passing a pointer to those data packets/the data to the control plane interface of the controller.

On receiving one or more routing table update instructions, the interface causes controller 402 (which has read/write access to the routing table) to write entries to the routing table and/or delete entries from routing table 401 in accordance with the routing table instructions it receives. The routing table is typically supported at a memory of the switching network interface device.

Preferably control plane interfaces of the present invention (306, 308 or 406) are provided with its own receive queue into which data packets of the predetermined protocol that are received over the network can be posted. The receive queue may have its own network address (e.g. IP address and port) so as to allow routing table instructions to be directed to a particular switching entity. It is also useful if routing table instructions can be received as broadcast packets. This allows all of the switching entities on a particular network or subnet to have their routing tables simultaneously updated by a management unit configured to transmit routing table instructions in data packets of the predetermined protocol.

It is advantageous if a control plane interface can transmit requests for routing table updates to another switching entity, such as a central management unit comprising a master routing table or having a map of the topology of the network. Such requests can be transmitted when the switching entity does not know where to forward a data packet to (i.e. there is no entry in its routing table) or the switching entity discovers that it is forwarding data packets to an incorrect address (through notifications from downstream switches, or other mechanisms known in the art). The ability to request routing table updates from other switching entities provides an alternative to the updating of routing tables by means of slow ARP updates filtering through a network. It is also advantageous if a control plane interface can transmit routing table updates which it learns of to other switching entities, such as a central management unit. This ensures that other switching entities, and in particular a master routing table or network map, is kept up to date. If a control plane interface is capable of transmitting requests it is preferred that the interface (or its receive queue) is assigned a network address such that responses can be sent to the interface.

In the case that a control plane interface has an associated receive queue, a packet filter can identify which incoming packets to trap and direct into the receive queue from the destination address of the data packets.

Note that a network interface device supported at a data processing system comprising a device driver for that network interface device could be configured to have its routing table managed by means of a control plane interface provided at the network interface controller (described in the second embodiment above) or by means of a control plane interface provided at the device driver (described in the first embodiment above).

By way of an example of the benefits of the present invention, consider the situation in which data processing system 300 is a blade of a blade server and switching entity 400 is the chassis network interface device of that blade server. The blade server is connected into a network comprising one or more switches for routing traffic around the network, each of those switches also being a switching entity 400. Now suppose a guest operating system (e.g. a virtual machine) running on the identified blade is to be migrated to another blade on the same server, or another server entirely. This can occur when blades have to be replaced or when the configuration of the server changes, and it is often desirable to perform such migrations on live servers supporting guests which require as close to possible 100% uptime. Examples include servers hosting websites and servers handling financial transactions. The guest domains supported at such servers typically have a large number of open connections at any one time which have to be maintained.

Previously it has been difficult to seamlessly migrate a guest without that guest losing at least some of its connections or a significant number of network packets, which have to be re-sent. This is because changes to the configuration of a blade server which impact the routing tables of adjacent network entities take some time to filter through the network. For instance, it can take up to 30 seconds for a change to filter through the routing tables of a typical network by means of ARP.

By providing an interface to the routing tables of switches at all levels of a network fabric, the present invention allows such changes to be enacted at routing tables across a network at the moment the connections of a guest migrate from one blade to another. This can be achieved with the use of a central management unit configured to transmit routing table update instructions onto the network at the appropriate time so as to control the switch fabric of the network through the control plane interfaces provided at each switching entity.

Once central management unit on the network identifies that the guest migration is to occur (it could also be the entity initiating the migration), the central management unit transmits one or more data packets of the predetermined protocol onto the network. The data packets comprise routing table update instructions which indicate that all of the connections of the guest are now to be handled at a new physical location.

The control plane interface at each switching entity on the network receives the instructions and updates the entries in its routing table accordingly. Thus the routing tables at the switches of the network, at the network interface devices at the chassis of the affected blade servers, at the network interface devices at the affected blades of the blade servers and at the soft switching entities supported at the affected blades are all updated with the new routing table instructions. As a result, all data packets sent over the connections of the migrated guest are directed to the new physical location at which the guest resides at the moment that the guest migrates to the new location.

The mechanisms by which the data constituting a guest operating system can be migrated from one virtualised environment to another are generally dependent on the particular virtualised operating system being used. For example, VMWare version 3.5 includes a mechanism by which a virtual machine can be migrated from one VMWare server to another. In order to maintain the integrity of open network connections, the data copied to the new physical location of the guest includes its transmit, receive and event queues and other state associated with its network connections. It is generally unnecessary to transfer hardware state between machines because the loss of such state is not typically fatal to the connections to which that state relates.

The migration of the guest is preferably initiated or handled by the same management unit that is configured to transmit routing table update instructions to the switches of the network. This allows the management unit to perform the migration of the guest concurrently with the updating of the routing tables of the switches of the network.

The present invention therefore allows a single network entity to maintain a map of the topology of the network and initiate rapid changes to that topology by actively modifying the routing tables of the switching entities on the network. Because routing changes can be imposed on switching entities as changes in network topology occur, the integrity of data processing systems on the network and their connections is maintained. Conventionally, changes in routing information have lagged the actual changes in network topology due to the mechanisms used to propagate routing changes through the network.

The control plane interfaces disclosed herein are responsive to a common set of routing table update instructions that are carried in packets of the predetermined protocol. Thus, it is possible to manage all of the routing tables at a blade server as a single logical switch fabric by means of a set of routing table update instructions common to all of the switching entities, from hardware switches up to the virtualised guests of a data processing system.

As an alternative to using packets of a particular predetermined protocol to convey routing table update instructions to a switching entity, special packets having a predetermined structure could instead be used. Such packets could be identified at the filter by one or more of: the presence of one or more flags or other identifiers in each packet—preferably in the headers of such packets; the network address (e.g. IP address and port number) to which the packets are directed; the network address from which the packets originate. The filters described herein would under this alternative trap such special packets rather than data packets of a predetermined protocol.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

We claim:

1. A data processing system comprising:
a soft switching entity supported at a privileged software domain, the soft switching entity having a second routing table and being coupled to a second control plane interface arranged to receive routing table instructions; and
a network interface device comprising:
one or more network connection ports for connection to a network;
a first routing table supported at a memory of the network interface device;
a controller operable to modify the first routing table;
a first control plane interface of the controller arranged to receive routing table update instructions carried in one or more control packets received at the said ports; and
a filter configured to monitor data received at the one or more ports and, on identifying the one or more control packets, trap said control packets and pass the control packets or data contained therein to the first and second control plane interfaces,
wherein:
the first control plane interface is configured to, on receiving a routing table update instruction, cause the controller to update the first routing table in accordance with the routing table update instruction; and
on receiving a routing table update instruction at the second control plane interface, the second control plane interface is configured to cause the second routing table to be updated in accordance with the routing table update instruction.

2. A data processing system as claimed in claim 1, wherein the filter is configured to identify the one or more control packets using one or more of the following identifiers: the protocol to which control packets belong; the destination address of control packets; the source address of control packets; the presence of a flag or other identifier in the header of control packets.

3. A data processing system as claimed in claim 1, wherein the filter is configured to write control packets into a-receive queues associated with the first and second control plane interfaces.

4. A data processing system as claimed in claim 1, wherein the routing table update instruction identifies a plurality of entries in the first or second routing table for updating.

5. A data processing system as claimed in claim 4, wherein each receive queue has a unique network address and the control packets are directed to respective network addresses.

6. A data processing system as claimed in claim 1, wherein the first or second control plane interface is responsive to routing table instructions that include one or more of: a command to make or update an entry in the first or second routing table; a command to delete an entry in the first or second routing table; a command to read one or more entries in the first or second routing table and cause data representing said entries to be returned to a network address specified in the control packets.

7. A data processing system as claimed in claim 1, wherein the first control plane interface is operable to cause the network interface device to transmit onto the network a control packet comprising a request for one or more routing table update instructions.

8. A data processing system as claimed in claim 7, wherein the first control plane interface is configured to cause the network interface device to transmit the control packet onto the network when the network interface device receives one or more data packets which cannot be correctly routed using the routing table.

9. A data processing system as claimed in claim 1, wherein the network interface device is one of a switch, a router, and a switching network interface device supported at the chassis of a blade server.

10. A data processing system comprising:
a network interface device comprising a routing table;
a device driver for the network interface device supported at a privileged software domain of the data processing system and comprising a first control plane interface arranged to receive routing table instructions;
a soft switching entity supported at the privileged software domain, the soft switching entity having a routing table and being coupled to a second control plane interface arranged to receive routing table instructions; and
a filter configured to trap control packets carrying one or more routing table instructions received at the network interface device and pass those control packets or data contained therein to the first and second control plane interface,
wherein:
on receiving a routing table update instruction at the first control plane interface, the first control plane interface is configured to cause the device driver to update the routing table at the network interface device in accordance with the routing table update instruction; and
on receiving a routing table update instruction at the second control plane interface, the second control plane interface is configured to cause the soft routing table to be updated in accordance with the routing table update instruction.

11. A data processing system as claimed in claim 10, wherein the network interface device is configured to route data packets to and from a plurality of virtual network interfaces presented to a plurality of unprivileged software domains supported at the data processing system.

12. A data processing system as claimed in claim 11, wherein the privileged software domain is a hypervisor and the unprivileged software domains are virtual machines.

13. A data processing system as claimed in claim 11, wherein the privileged software domain is the kernel of an operating system and the unprivileged software domains are applications executing at the user level of the operating system.

14. A data processing system as claimed in claim 10, wherein the second control plane interface is supported at the device driver.

15. A data processing system as claimed in claim 10, wherein the second control plane interface is supported at the soft switching entity.

16. A data processing system as claimed in claim 10, wherein the soft switching entity is configured to route data packets to and from a plurality of unprivileged software domains supported at the data processing system.

17. A data processing system as claimed in claim 10, wherein the data processing system is a blade of a blade server.

18. A blade server comprising:
a chassis;
a network interface device; and
a plurality of blades,
wherein the network interface device comprises:
  one or more network connection ports for connection to a network;
  a routing table supported at a memory of the network interface device;
  a controller operable to modify the routing table; and
  a control plane interface of the controller arranged to receive routing table update instructions carried in one or more control packets received at the network connection ports, the control plane interface being configured to, on receiving a routing table update instruction, cause the controller to update the routing table in accordance with the received routing table update instruction,
and wherein each of the blades comprises a blade data processing system having:
  a blade network interface device comprising a routing table;
  a device driver for the respective blade network interface device supported at a privileged software domain of the respective blade data processing system and comprising a blade control plane interface arranged to receive routing table instructions; and
  a filter configured to trap control packets carrying one or more routing table instructions received at the respective blade network interface device and pass those control packets or data contained therein to the respective blade control plane interface, each of the blade control plane interfaces being configured to, on receiving a given routing table update instruction, cause the respective device driver to update the routing table at the respective blade network interface device in accordance with the given blade routing table update instruction.

19. A method for managing a data processing system accessible to a management unit over a network, the data processing system comprising a filter and presenting a plurality of control plane interfaces to the management unit, each control plane interface having a respective routing table, the method comprising:
the management unit transmitting to the data processing system one or more control packets that include one or more routing table update instructions; and
the data processing system:
  trapping at the filter control packets carrying one or more routing table update instructions and passing those control packets or data contained therein to the plurality of control plane interfaces; and
  on receiving routing table update instructions at each of the control plane interfaces each control plane interface causing its respective routing table to be updated in accordance with the routing table update instructions.

20. A system comprising:
a blade server as claimed in claim 18, wherein each of the blades further comprises a soft switching entity supported at the privileged software domain, each of the soft switching entities having a routing table and being coupled to a respective second control plane interface arranged to receive routing table instructions, and wherein each of the second control plane interface is configured to, on receiving a particular routing table update instruction, cause the respective soft routing table to be updated in accordance with the particular routing table update instruction;
an external network switch external to the blade server interface device, the external network switch having an external switch network connection port for connection to a network, an external switch routing table supported at a memory of the external network switch, an external switch controller operable to modify the external switch routing table, and an external switch control plane interface of the external switch controller arranged to receive routing table update instructions carried in one or more control packets received at the external switch port, the external switch control plane interface being configured to, on receiving a particular routing table update instruction, cause the external switch controller to update the external switch routing table in accordance with the particular routing table update instruction; and
a network management entity accessible to the blade server and network switch over a network,
wherein the network management entity is configured to, on initiating the migration of a guest operating system supported at a first blade of the blade server from that blade server to another entity on the network, to transmit one or more routing table update instructions to the blade server and network switch so as to cause the network switch, the network interface device at the chassis of the blade server, the network interface device at the first blade of the blade server, and the soft switching entity at the first blade to have each of their respective routing tables updated in accordance with the routing table update instruction.

* * * * *

UNITED STATES PATENT AND TRADEMARK OFFICE
CERTIFICATE OF CORRECTION

PATENT NO. : 8,423,639 B2
APPLICATION NO. : 12/900217
DATED : April 16, 2013
INVENTOR(S) : Steven L. Pope and David Riddoch It is certified that error appears in the above-identified patent and that said Letters Patent is hereby corrected as shown below:

In the Claims

In Claim 3, at Column 12, line 12, delete "a-".

Signed and Sealed this
Twenty-first Day of May, 2013

Teresa Stanek Rea
*Acting Director of the United States Patent and Trademark Office*